US 12,544,306 B2

(12) United States Patent
Gloria Bello et al.

(10) Patent No.: US 12,544,306 B2
(45) Date of Patent: Feb. 10, 2026

(54) CLOSURE SYSTEM FOR CONTAINERS USED IN WATER CASCADE STERILIZATION

(71) Applicant: IDE Tecnología S.A. de C.V., Jalisco (MX)

(72) Inventors: Oscar Gloria Bello, Jalisco (MX); Juan Pablo Hernández Vera, Jalisco (MX); Roberto Krumm Cortes, Jalisco (MX)

(73) Assignee: IDE TECNOLOGÍA S.A. DE C.V., Guadalajara (MX)

( * ) Notice: Subject to any disclaimer, the term of this patent is extended or adjusted under 35 U.S.C. 154(b) by 547 days.

(21) Appl. No.: 16/637,476

(22) PCT Filed: Aug. 6, 2018

(86) PCT No.: PCT/IB2018/000840
§ 371 (c)(1),
(2) Date: Feb. 7, 2020

(87) PCT Pub. No.: WO2019/030559
PCT Pub. Date: Feb. 14, 2019

(65) Prior Publication Data
US 2020/0246221 A1    Aug. 6, 2020

(30) Foreign Application Priority Data
Aug. 7, 2017    (GB) ...................................... 1712668

(51) Int. Cl.
*A61J 1/14*    (2023.01)
*A61L 2/00*    (2006.01)
(Continued)

(52) U.S. Cl.
CPC ........... *A61J 1/1418* (2015.05); *A61L 2/0088* (2013.01); *A61L 2/26* (2013.01); *B29C 45/0001* (2013.01);
(Continued)

(58) Field of Classification Search
CPC .......................... A61J 1/1418; B65D 41/3428
See application file for complete search history.

(56) References Cited

U.S. PATENT DOCUMENTS

| 4,442,947 A | 4/1984 | Banich, Sr. |
| 2001/0027957 A1 | 10/2001 | Kano |

(Continued)

FOREIGN PATENT DOCUMENTS

| EP | 2226264 A4 | 3/2011 |
| JP | 2003095293 | 4/2003 |

(Continued)

OTHER PUBLICATIONS

JP_2003095293_translation (Year: 2003).*
(Continued)

*Primary Examiner* — Elizabeth A Robinson
*Assistant Examiner* — Changru Chen
(74) *Attorney, Agent, or Firm* — DINSMORE & SHOHL LLP

(57) ABSTRACT

A closure system for a screw top container intended to contain a pharmaceutical or surgical medium comprises: a screw cap including a main body comprised of an annular wall with an internal thread for cooperating with an external thread adjacent an open end of the container, the body having a first open end for receiving the open end of the container and a second end closed by an end disc; a sealing formation within the main body for forming a seal with the open end of the container; and a tamper-evident band connected to the screw cap at the open end of the main body (Continued)

by at least one severable linkage, wherein the screw cap, sealing formation and tamper-evident band are integrally formed as a single unit for maintaining a hermetic seal with the container throughout a terminal sterilisation process.

18 Claims, 8 Drawing Sheets

(51) Int. Cl.
  *A61L 2/26* (2006.01)
  *B29C 45/00* (2006.01)
  *B29D 22/00* (2006.01)
  *B29K 23/00* (2006.01)

(52) U.S. Cl.
  CPC ....... *A61L 2202/21* (2013.01); *A61L 2202/23* (2013.01); *B29D 22/003* (2013.01); *B29K 2023/14* (2013.01)

(56) References Cited

U.S. PATENT DOCUMENTS

| | | | |
|---|---|---|---|
| 2002/0158037 | A1 | 10/2002 | Kano et al. |
| 2003/0057176 | A1 | 3/2003 | Kitterman et al. |
| 2008/0251491 | A1 | 10/2008 | Krautkramer |
| 2016/0332783 | A1* | 11/2016 | Kim .................. B65D 41/3428 |

FOREIGN PATENT DOCUMENTS

| | | | |
|---|---|---|---|
| JP | 2003095293 A | * | 4/2003 |
| JP | 4443005 B2 | | 3/2010 |
| WO | 2007148993 A2 | | 12/2007 |

OTHER PUBLICATIONS

Search Reported pertaining to GB1712668.1 dated Nov. 13, 2017.
International Search Report and Written Opinion pertaining to PCT/IB2018/000840 mailed Nov. 6, 2018.
EP Communication pursuant to Article 94(3) EPC, Application No. 18 759 376.9 dated Feb. 20, 2023 (6 pages).

* cited by examiner

CLOSURE SYSTEM FOR CONTAINERS USED IN WATER CASCADE STERILIZATION

CROSS-REFERENCE TO RELATED APPLICATIONS

The present application is a National Stage Entry of International Patent Application No. PCT/IB2018/000840, filed Aug. 6, 2018, which claims the benefit of priority to GB Application No. 1712668.1, filed Aug. 7, 2017, the contents of which are each hereby incorporated by reference in their entireties.

TECHNICAL FIELD

The present disclosure relates to a closure system for use in containment, transport, storage and sterilisation of pharmaceutical and/or surgical solutions. In particular, the present disclosure relates to a closure system for use in terminal sterilisation, and more particularly, a closure system for use in a water cascade sterilisation process.

BACKGROUND

It is necessary that pharmaceutical and/or surgical solutions intended for human use, either for oral consumption, injection or introduction to the human body by other means, are sterilised to ensure that potentially dangerous biological agents are not inadvertently introduced to the human body. To avoid the high costs of maintaining a sterile manufacturing facility, such solutions are often sterilised following storage in an appropriate container. A preferred method of sterilisation is the use of a 'water cascade sterilisation' process.

The water cascade sterilisation process is a form of terminal sterilisation that uses super-heated water to swiftly and gently sterilise solutions stored in closed receptacles or containers. The process typically involves containers containing the solution to be sterilised being firstly placed in a chamber of an autoclave. Deionized, heated sterilising water is then cascaded evenly over the containers. The sterilising water is heated to temperatures of between 100° C. and 135° C. using a heat exchanger, and is effectively 'rained down' onto the containers. The sterilising water gently heats the solutions within the containers to a similar temperature to that of the sterilising water, thereby sterilising the solutions.

To withstand this process, the containers used must be both resistant to the high temperatures involved, and must be sealed using a closure system that maintains a hermetic seal with the container throughout the process. This hermetic seal must also be maintained both before and after the process to avoid contamination of the solution.

The container and closure system therefore must have a number of other properties to be suitable for sterilising and storing surgical and/or pharmaceutical solutions. For example, the container and closure system must not lose their physical, mechanical or aesthetic properties during the terminal sterilisation or water cascade sterilisation process. It is also necessary to indicate that no contamination of the solution has been caused by the removal of the closure system, and so an indicator is required to indicate when the closure system has been removed and/or tampered with. Finally, the user must be able to open and reseal the container easily using the closure system.

Conventional closure systems for use in terminal sterilisation processes such as water cascade sterilisation have a number of associated problems. An example of a conventional closure system and the disadvantages associated with such a system are described below with reference to FIGS. 1 and 2. The conventional closure system 10 of FIGS. 1 and 2 is a screw cap closure system that is cooperable with a neck or open end 12 of a container, and which can be removed from the neck 12 and replaced by a user by manually twisting the cap.

FIG. 1 shows a cross section of the closure system 10 in isolation, while FIG. 2 shows a cross section of the closure system 10 and a neck 12 of a container when the closure system 10 is in its operative position in a sealing relation with the container.

The conventional closure system comprises three distinct, component parts: a housing 14, a seal 16 and a tamper-evident assembly 18. Each of these component parts is manufactured independently and fitted together to form the complete closure system 10.

The housing 14 forms the external surface of the closure system 10, and is the component that a user grips and twists in order to remove the closure system 10. The housing 14 forms the main body of the conventional closure system 10, providing a structure to which the seal 16 and tamper-evident assembly 18 may be mounted. The external surface of the housing 14 is exposed to the heated water that falls on the closure system 10 during sterilisation.

The housing 14 comprises a hollow shell formed of a substantially annular band 20 that is closed at one end by an end disc 22 and open at the opposite end 24 so as to define a generally U-shaped cross section. In use, the housing 14 receives the container neck 12 through its open end 24.

The annular band 20 of the housing 14 comprises an inwardly-facing surface 26 that may be considered to have 3 regions. A first region 28, disposed closest to the end disc 22 of the annular band 20, comprises a first recess 34 and a first lip 36. The first recess 34 and lip 36, together with the end disc 22, maintain the seal 16 in position, in use.

A second region 30, positioned between the first region 28 and a third region 32, and closer to the open end 24 than the first region 28, comprises a moulded female thread 38. The female thread 38 is cooperative with a corresponding male thread 40 present on the container neck 12 for application of the closure system 10 to the container.

A third region 32, disposed between the open end 24 of the housing 14 and the second region 30, comprises a second recess 42, and a second lip 44. The second recess 42 and second lip 44 are configured for receiving and retaining the tamper-evident assembly 18.

Disadvantageously, the incorporation of two recesses 34, 42 into the housing 14 means that the thickness of the housing 14 is not uniform. Because of this, weaknesses may be formed at the positions where the housing 14 thickness changes or at the points where the housing 14 is thinnest. A discrepancy in the strength of the closure system 10 may allow it to be tampered with or disassembled during normal use.

Furthermore, each recess 34, 42 of the housing 14 must be a particular size to allow the tamper-evident assembly 18 and the seal 16 to be fitted correctly. This requires very small tolerances in the machinery used to manufacture the housing 14, the seal 16 and the tamper-evident assembly 18.

The seal 16, which is retained within the first recess 34 during assembly of the closure system 10, comprises a formed and shaped disc 46. The disc 46 is typically moulded to adopt the required shape and is shaped to be rotationally symmetrical.

Following assembly of the closure system 10, the seal 16 is retained by the first recess 34, or by the action of both the first lip 36 formed by the housing 14 and the seal 16 itself. The seal 16 should secured within the recess 34 so as to align with a common central axis, 'C', of the housing 14, although in practice this is unlikely to occur due to differences between machine tolerances.

The seal 16 and housing 14 together form an annular snap joint, whereby the seal 16 is deformed to position it within the first recess 34. The first recess 34 is dimensioned so that the seal 16 is maintained in a slightly deformed arrangement, and kept in place by the force it exerts on the surface of the first recess 34. The lip 36 ensures that the seal 16 stays within the first region 28 and is not displaced from the recess 34.

The seal 16 comprises a ridge 48 formed into the disc 46, which is configured to come into contact with an inner surface 50 of the container neck 12 in use so as to form a hermetic seal therewith. The ridge 48 is formed as a fold in the disc 46, and is folded such that its outer diameter relative to the central axis of the housing 14 is slightly larger than that of a container neck 12. To form a hermetic seal with a container neck 12, the seal 16 must be deformed slightly so as to form an interference fit. Therefore, when in its sealing position within a container neck 16, the ridge 48 exerts a pressure at its outer edge on the inner surface 50 of the container neck 12. A large interference is required between the seal 16 and the container neck 12 to form the required airtight fit and hermetic seal.

The seal 16 has a number of associated problems. In particular, the seal 16 has to be sufficiently rigid so that the pressure from contact between a container neck 12 and the ridge 48 is such as to form a hermetic seal. The degree of interference required between seal 16 and container neck 12 means that significant friction must be overcome to remove the seal 16 from the neck 12. It is often the case, therefore, that the seal 16 becomes detached from the housing 14 and remains lodged within the container neck 12 because the force required to remove the seal 16 from the neck 12 is greater than that required to separate it from the housing 14.

If the seal 16 and housing 14 are manufactured to stop this from happening, the force required to remove the seal 16 from the neck 12 of the container may become quite high, and may make removal of the closure system 10 by a user particularly difficult.

In some cases where the closure system 10 is incorrectly applied, for example by not twisting the closure system 10 tightly enough, the seal may not form a hermetic seal with the neck 12 of the container.

Returning to the closure system 10, the third region 32 comprises a second recess 42 for receiving the tamper-evident assembly 18. The tamper-evident assembly 18 is an indicator to an end-user that the closure system 10 has not been removed from the container neck 12 since it was first applied, and ensures that the solution has not been contaminated by removal of the closure system 10.

The tamper-evident assembly 18 typically comprises a tamper-evident band 54 and a fixing ring 56, which are connected by a plurality of linkages (not visible in FIG. 1 or FIG. 2). The fixing ring 56 is disposed within the second recess 42, and retained and secured within the second recess 42 in a similar manner to the seal 16, i.e. by an interference fit. The tamper-evident assembly 18 is initially mounted within the second recess 42 by deformation of the fixing ring 56. The diameter of the second recess 42 is similar or smaller than that of the fixing ring 56, so that the fixing ring 56 is retained in a deformed arrangement within the recess 42 and its position maintained by the pressure it exerts on the surface of the second recess 42.

The linkages extending between the fixing ring 56 and the tamper-evident band 54 are configured to break easily when a rotational torque is applied to them. Container necks 12 with which the closure system 10 is used are manufactured to incorporate a rim 58 beneath the male thread 40 of the neck 12 with which the closure system 10 cooperates. The rim 58 that is wider than the diameter of the tamper-evident band 54 and so the tamper-evident band 54, which is disposed beneath the rim 58 when the closure system 10 has been applied, as shown in FIG. 2, is maintained in position by the rim 58 when the closure system 10 is rotated to remove it. However, the fixing ring 56 is secured and moves with the housing 14 as it rotates. Therefore, a rotational torque is exerted on the linkages, which consequently break due to the interaction of the rim 58 and tamper-evident band 54, thereby separating the tamper-evident band 54 and the fixing ring 56. The tamper-evident band 54 remains around the container neck 12, indicating to any user that the closure system 12 has been removed at least once previously.

As with the seal 16 and housing 14, the tamper-evident assembly 18 also has associated faults. For example, variation in the assembly process may cause the tamper-evident assembly 18 itself to become detached from the housing 14 during initial application of the closure system 10 to the container neck 12. In some cases, interaction between the fixing ring 56 and the container neck 12 may cause the linkages to break during initial application, separating the tamper-evident band 54 and the fixing ring 56.

In addition to the aforementioned problems with each individual component of the known closure system 10, there are further disadvantages associated with a closure system 10 as described above, which will now be described.

When considering the function of each component part, each is required to be manufactured from a particular material. For example, the tamper-evident assembly 18 is typically manufactured from high-density polyethylene, while the housing 14 and seal 16 are typically manufactured from polypropylene. Materials such as these may have softening temperatures close to that encountered during water cascade sterilisation which would therefore risk loss of physical, mechanical and aesthetic properties if used in such a process.

Manufacturing three separate components to create the conventional closure system 10 requires at least three pieces of separate machinery to produce each component and a further piece of machinery to assemble the complete closure system 10. This is particularly inefficient, both in terms of cost and time. Increases in numbers of machines required for manufacture increase the likelihood of variability in the final product.

The present disclosure has been devised to mitigate or overcome at least some of the above-mentioned problems.

SUMMARY

According to an aspect of the present disclosure there is provided a closure system for a screw top container intended to contain a pharmaceutical or surgical medium. The closure system comprises a screw cap including a main body comprised of an annular wall with an internal thread for cooperating with an external thread adjacent an open end of the container. The body has a first open end for receiving the open end of the container and a second end closed by an end disc. The closure system further comprises a sealing formation within the main body for forming a seal with the open end of the container. The closure system also comprises a tamper-evident band connected to the screw cap at the open end of the main body by at least one severable linkage. The screw cap, sealing formation and tamper-evident band are integrally formed as a single unit for maintaining a hermetic seal with the container throughout a terminal sterilisation process.

Advantageously, manufacturing the screw cap, sealing formation and tamper-evident band as an integral, single unit results in an efficient manufacturing process that saves on both cost and time when compared to the prior art as described in relation to FIGS. 1 and 2. In various embodiments, only a single assembly machine may be used for assembly as opposed to four as required by the prior art, and so lends itself to an increased manufacturing output.

Furthermore, integrating the sealing formation and tamper-evident band with the screw cap advantageously ensures that the closure system is resistant to external forces and unlikely to suffer any malfunctions during application, use, or removal, especially those associated with the prior art. For example, an integral sealing formation is unable to become dislodged from its mounting position, and so the seal formed by the closure system with a container is more reliable than that of the prior art.

An additional benefit is seen in the design of the components. The unitary nature of the closure system allows for optimisation of the features and formations present on the closure system, and no features are compromised due to a lack of space or the requirement that various parts must fit together.

Optionally, the sealing formation may be configured to extend from the end disc towards the first open end of the main body to hermetically seal the container between first application prior to terminal sterilisation and first removal of the closure system after terminal sterilisation.

Moreover, the sealing formation may comprise annular inner and outer seals. The inner seal may be configured to apply outward pressure to an internal surface of the open end of the container so as to form a first seal. The outer seal may be configured to apply inward pressure to an external surface of the open end of the container so as to form a second seal.

The provision of at least two seals further enhances the seal potential of the closure system, and results in a particularly advantageous double sealing system, with a seal positioned on either side of the open end of the container.

The sealing formation may further comprise a block between the inner and outer seals and the end disc. The block beneficially displaces the inner and outer seals from the end disc, resulting in a positioning of the inner and outer seals at a desired and optimal position relative to the container during application.

The block may be configured to form a third seal with an upper surface of the open end of the container, in use, thus the block is an annular block or barrier. In use, the screw cap of the closure system may be applied to a container neck and is rotated through a predetermined angle to ensure that a hermetic seal is also formed between the sealing block and the container neck. Such third seal further enhances the sealing afforded by the closure system. In particular, since the block provides a region of increased thickness as compared to the thickness of the end disc elsewhere, the inner and outer seals as well as the third seal provided by the block itself remain in sealing contact with the container at all stages before, during and after the container fitted with the closure system is subjected to water cascade sterilisation. Thus, while the portion of the end disc that lies inside the boundary of the block may become convex due to increased pressure and temperature within the container during such sterilisation (and conversely may become concave during subsequent cooling, etc.), the thickness of the block provides rigidity so that convex or concave distortion of the end disc in the region of the block does not occur or is at least substantially eliminated. Accordingly, the hermetic seals that are formed between the container and the inner, outer and block seals may be preserved throughout and are not affected by any distortion of the end disc.

The block has a thickness or depth sufficient to maintain the hermetic seals between the container neck and the inner seal, the outer seal and the block irrespective of any concavity/convexity generated elsewhere on the end disc. Advantageously, the block may have a depth at least half (0.5) the depth of the end disc adjacent to (but not overlapping with) the block elsewhere, and preferably a depth approximately the same as or greater than the depth of the end disc. Thus the total thickness (depth) of the screw cap in the region of the block may be at least about 1.5 times, such as about 2 times (double) the thickness of the end disc or greater in the region adjacent to the block. For example, the end disc may have a thickness from about 1 mm to about 4 mm, and the block has thickness at least equivalent thereto, such that the thickness of the end disc in the region of the block is from about 2 mm to about 8 mm or greater. In one embodiment, the end disc may have a depth of about 1.3 mm and the block may have a depth of about 1.2 mm such that the total depth in the region of the block is about 2.5 mm. Such thickening of the screw cap by means of the block allows the end disc to flex due to high pressure and temperature within the container during water cascade sterilisation except in the region of the block so that the aforementioned hermetic seals are unaffected.

The surface of the block that extends, and is exposed, between the inner and outer seals and which provides the third or block seal, may be substantially flat thereby providing a uniform area of contact with the container neck in use.

The inner seal may comprise a base region connected to the end disc, and a pressure region configured to form the first seal with the container that is offset from the base region relative to a common central axis of the closure system.

Advantageously, the inner seal may comprise a base region connected to the block and a pressure region configured to form the first seal with the container that is offset from the base region relative to a common central axis of the closure system. Thus the base region may extend from a lower surface of the block that is formed between the inner and outer seals and the end disc, and a pressure region may depend from the base region and be configured to form the first seal with the container, for example, the pressure region may be offset from the base region relative to a common central axis of the closure system.

The inner seal may be configured to be displaced inwardly towards a common central axis of the closure system when coming into contact with the open end of the container. Biasing the inner seal in this way results in a more resilient seal being formed against the container in use. Furthermore, the block provides support for the inner seal and the resulting rigidity of the end disc in the region of the block ensures that the seal formed in use between the inner seal and the container neck is maintained even during water cascade sterilisation, as is the hermetic seal formed between the block and the container neck.

The pressure region may be offset such that it extends from the base region at an angle in a direction towards the outer seal. The pressure region may comprise a convex region whereby the sealing pressure exerted by the pressure region against the inner surface of the open end of the container increases during terminal sterilisation. As the inner and outer seals are connected to and integral with the end disc of the closure system, whether connected directly or indirectly via the block seal, the end disc can advantageously affect the pressure applied to the container neck, the inner and outer seals, as well as the block seal therebetween, operating in tandem to create sufficient and reliable seals with the container.

The outer seal may also extend from a lower surface of the block and is spaced from the inner seal to permit the open end of the container to be inserted therebetween. The outer seal may be positioned such that a channel formed between it and the inner seal is narrower than the thickness of the container neck that is to be received. The outer seal may be configured to be displaced outwardly away from a common central axis of the closure system when coming into contact with the open end of the container.

The base region of the inner seal may have a length such that a seal is formed against the inner surface of the container at a position beyond the position of the seal formed against the outer surface of the container by the outer seal.

The outer seal may be configured to exert a sealing pressure around the extremity of the open end of the container neck, which pressure increases following terminal sterilisation as the medium in the container cools.

At least one of the inner and outer seals may comprise a tip region configured to guide the open end of the container into a channel formed therebetween.

The closure system may comprise a flange extending from the tamper-evident band towards the container.

The flange may be movable between first and second orientations prior to application of the system. In the second orientation, the flange may be configured to interact with the container to restrict removal of the closure system.

First removal of the closure system may require severance of the at least one linkage when the flange is in the second orientation. Severing one or more linkages may result in the tamper-evident band becoming partially or fully disconnected from the screw cap, neatly illustrating to the user that the closure system has been removed at least once before.

In the first orientation, the flange may extend away from the first open end of the screw cap. In the second orientation, the flange may extend towards and/or through the first open end screw cap. The first orientation is particularly useful for manufacturing the closure system, while the second orientation facilitates application of the screw cap and results in a closure system that is particularly difficult to remove without severing the linkages and disconnecting the tamper-evident band.

The closure system may be manufactured using an injection moulding process. The closure system may be manufactured using a single mould.

The closure system may comprise a polypropylene copolymer. The polypropylene copolymer may have a high tensile strength at yield, a high flexural modulus and a high percentage elongation at yield.

The polypropylene copolymer may be an ethylene-propylene copolymer.

Such a polymer is particularly advantageous in its properties, and is able to withstand the high temperatures utilised in terminal sterilisation processes as well as the forces exerted upon the closure system during transit and use.

According to another aspect of the present disclosure, there is provided a closure system for a screw top container intended to contain a pharmaceutical or surgical medium comprising: a screw cap including a main body comprised of an annular wall with an internal thread for cooperating with an external thread adjacent an open end of the container, the body having a first open end for receiving the open end of the container and a second end closed by an end disc; and a sealing formation for forming a seal with the open end of the container; wherein the screw cap and sealing formation are integrally formed as a single unit for maintaining a hermetic seal with the container throughout a terminal sterilisation process. The sealing formation may comprise the aforementioned inner, outer and block seals as hereinbefore described.

According to a further aspect of the present disclosure, there is provided a closure system for a screw top container intended to contain with a pharmaceutical or surgical medium comprising: a screw cap including a main body comprised of an annular wall with an internal thread for cooperating with an external thread adjacent an open end of the container, the body having a first open end for receiving the open end of the container and a second end closed by an end disc; a sealing formation for forming a seal with the open end of the container; and a tamper-evident band connected to the screw cap at the open end of the main body by at least one severable linkage, wherein the closure system is manufactured from a copolymer polypropylene. The sealing formation may comprise the aforementioned inner, outer and block seals as hereinbefore described.

According to an aspect of the present disclosure, there is provided a sealed container comprising a container having an open end and the closure system as described above.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

For the purpose of the following description it will be appreciated that references to upper, lower, upward, downward, above and below, for example, are not intended to be limiting and relate only to the orientation of a closure system as shown in the relevant illustration.

Figure 1:
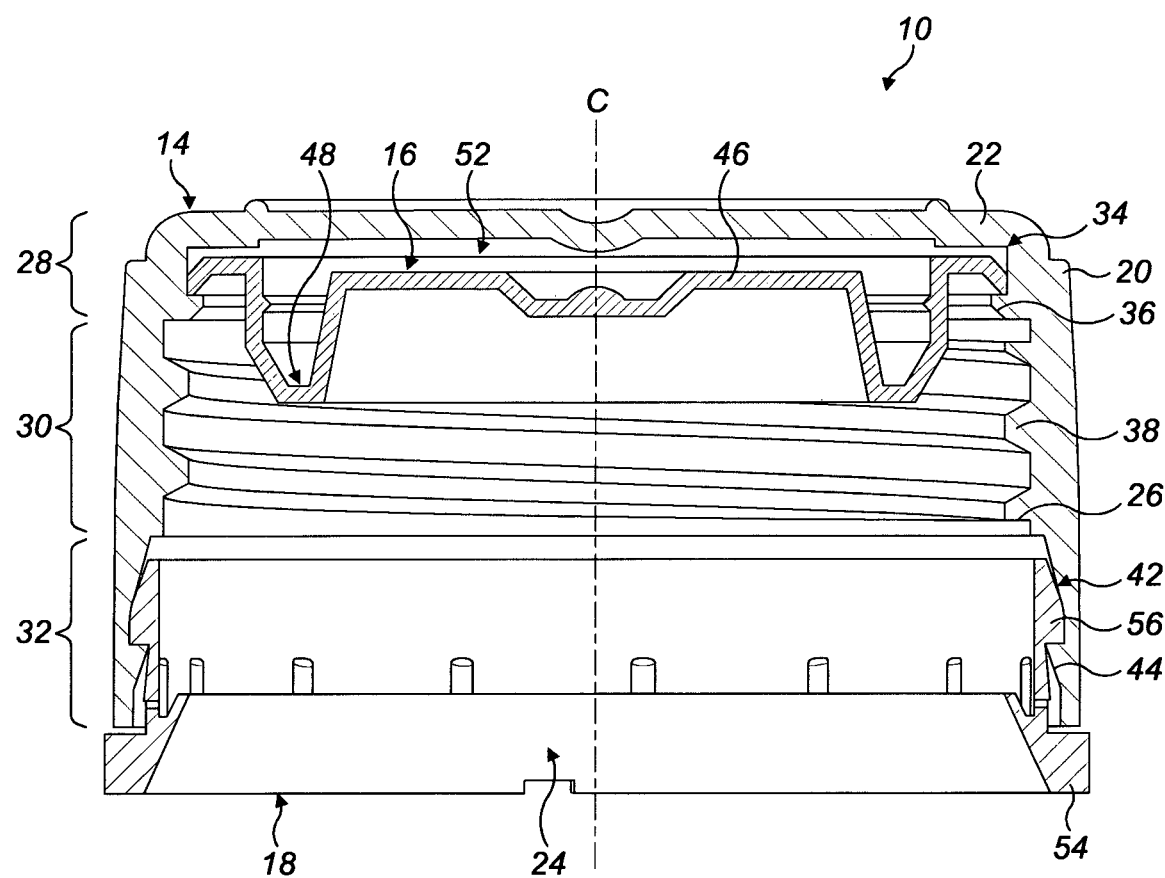
FIG. 1 is a cross section of a known closure system comprising three separate component parts.
Figure 2:
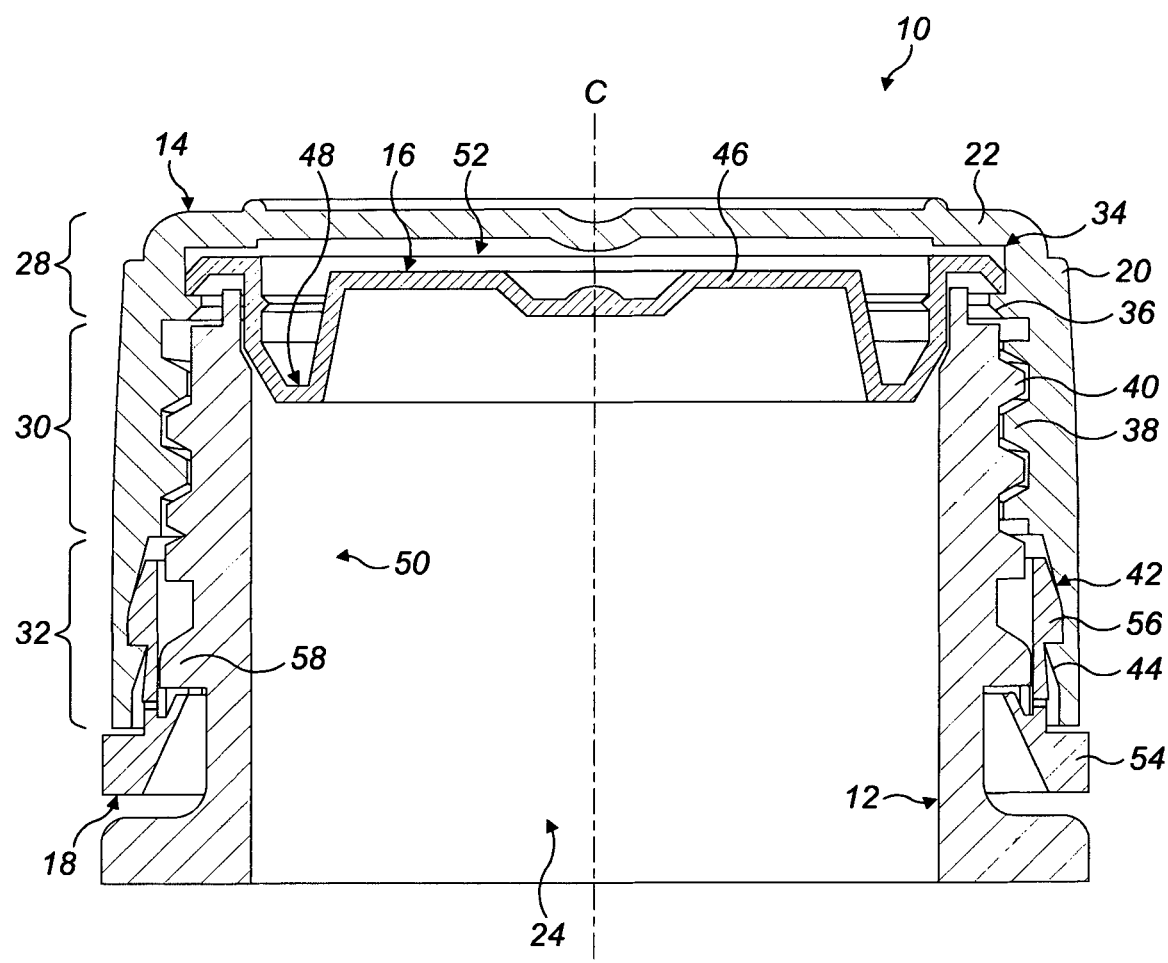
FIG. 2 is a cross section diagram of the closure system of FIG. 1 in use when sealing a container neck.
Figure 3:
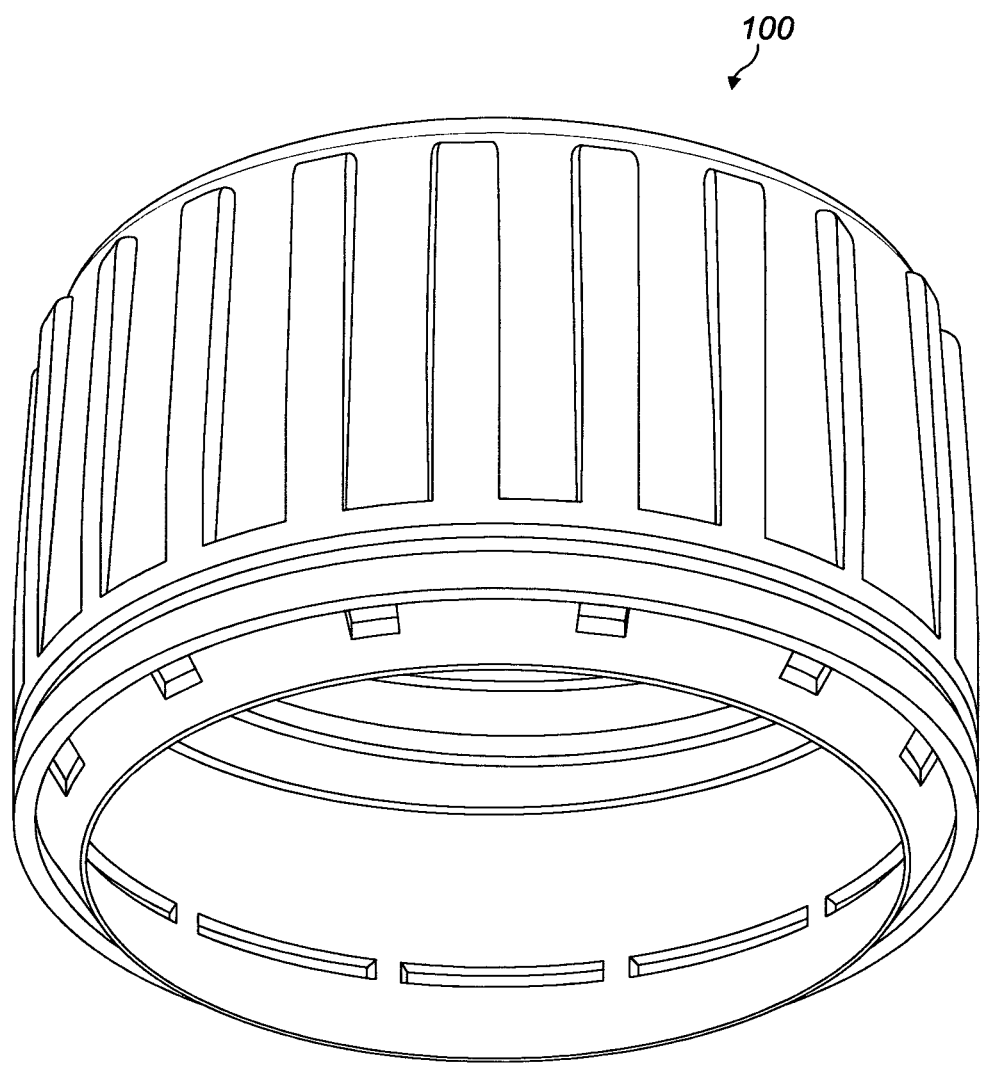
FIG. 3 is a perspective view of a closure system in a first configuration, according to one or more embodiments shown and described herein.

The present disclosure relates to a closure system of the type generally shown in FIG. 3. The closure system is a screw cap 100 for hermetically sealing a neck of a conventional, screw top container intended to contain a pharmaceutical or surgical medium. Conventional containers comprise a neck attached to a body in which the solution is stored, the container neck providing access to the container body. The container neck is typically a cylindrical port that is narrower than the container body and connects to the container body at one end, the other end being open for receiving and dispensing solutions. A typical container neck incorporates a male thread adjacent an open end of the container and a lower rim that extends radially outwardly from the container neck beneath the male thread.

The container and screw cap 100 together are configured for use in terminal sterilisation processes, and, in particular, in water cascade sterilisation processes in which solutions contained in hermetically sealed containers are showered with water at high temperatures in excess of 100° C., often in excess of 120° C. and sometimes as high as or higher than 130° C. The screw cap 100 as described herein may also be used to maintain a hermetic seal with a container neck for the purposes of general storage and transportation of sterile solutions without contamination.

Figure 4:
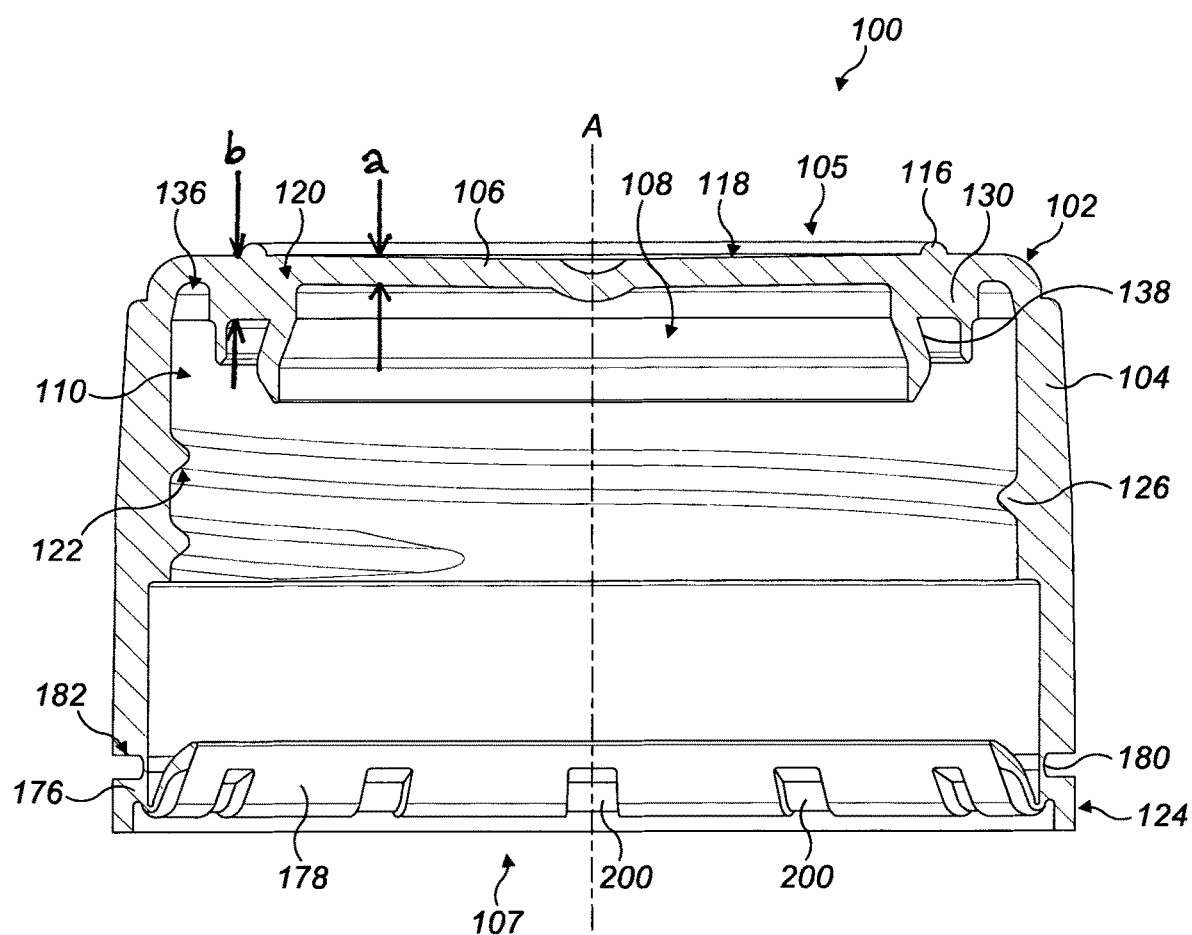
FIG. 4 is a cross section of the closure system of FIG. 3 in a second configuration, according to one or more embodiments shown and described herein.
Figure 5:
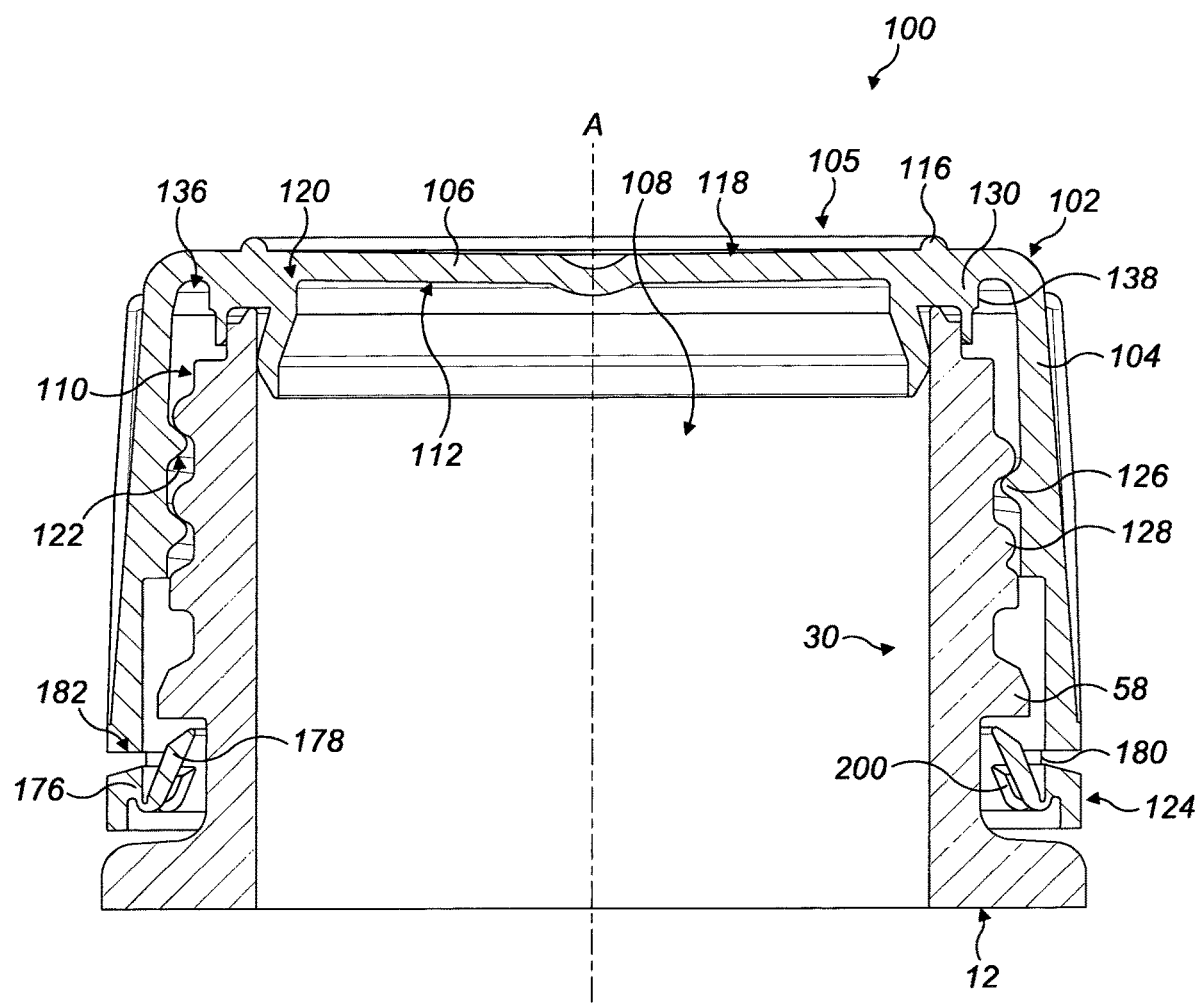
FIG. 5 is a cross section of the closure system of FIG. 3 in use when sealing a container neck and when in the second configuration, according to one or more embodiments shown and described herein.

FIGS. 3, 4 and 5 illustrate one embodiment of the closure system. FIG. 3 illustrates a perspective view of the closure system, FIG. 4 shows a cross-sectional view of the closure system in isolation and FIG. 5 illustrates a cross-sectional view of the closure system in use, hermetically sealing a container at its open end or neck 12.

The screw cap 100 of FIGS. 3, 4 and 5 comprises a main body 102 having a substantially annular wall 104 and an end disc 106. The body 102 therefore has the shape of a hollow cylinder that is covered, or closed, at one end 105 by the end disc 106, and open at the other end 107 for receiving the container at its open end 12. The body 102 surrounds an internal volume 108 that is bounded by internal faces 110, 112 of the wall 104 and end disc 106, and ends at the uncovered end of the body 102. The body 102 is rotationally symmetrical about a common central axis of the screw cap 100, 'A'.

It will be understood that any references herein to 'inward', 'outward', 'inwardly-facing', 'outwardly facing', any derivation thereof or any related term are taken to be relative to the common central axis, A, of the screw cap 100.

The body 102 comprises a plurality of external features 114 to aid an end user in gripping the body 102 and applying a rotational torque to the screw cap 100 in order to remove it from the container neck 12 to which it has been attached. The external features 114 of the screw cap 100 of the present embodiment are in the form of regularly spaced rectangular projections, such as series of ridges, that extend between opposite ends of the body 102, although it will be appreciated that any external feature 114 may be incorporated that aids with gripping the screw cap 100, and in some embodiments, no external features will be incorporated at all.

Additional external features 116 are included on an upper external face 118 of the body 104, at its covered upper end, although these are purely aesthetic and so will not be discussed in detail here.

The screw cap 100, in some embodiments, further comprises three distinct, functional formations that are integral with, and are integrally formed as part of, the body 102. That is to say that the screw cap 100 can be considered to comprise a single unitary and continuous structure or unit, and is formed of a single piece of material with no joints or fastenings. In other words, each of the formations is incorporated within the composition and structure of the body 102. Manufacturing the screw cap 100 comprises manufacturing each of the three formations and the body 102 simultaneously, using, for example, a single mould or model.

Now referring to FIGS. 4 and 5, in which the formations can be most clearly seen, the body 102 comprises a sealing formation 120, a thread formation 122, and a tamper-evident formation 124. The sealing formation 120 is configured to hermetically seal the container neck 12 to which the screw cap 100 is applied between first application, i.e. prior to the terminal sterilisation process and first removal of the closure system 100 following the sterilisation process. The thread formation 122 comprises an internal thread 126, here a female thread, configured to fix the screw cap 100 to the container neck 12 by cooperation with the corresponding external thread, a male thread here, of the neck 12. The tamper-evident formation 124 is configured to indicate to an end user whether the screw cap 100 has been previously removed from the container neck 12.

Each of the formations 120, 122, 124 are aligned with and surround the common central axis, A.

Although only shown in cross-section here for clarity, it will be appreciated that each of the formations 120, 122, 124 extend around the entirety of the body, having the same contours and cross sections as those shown in the figures, unless stated otherwise.

Initially considering the thread formation 122, it can be seen from FIG. 4 that the female thread 126 of the screw cap 100 protrudes inwardly from the internal face 110 of the body 102 towards the common central axis A of the body. The thread 126, whose cross section is that of a conventional female thread for use in closure systems of this type, is arranged helically around the internal face 110 of the body 102. The length of the thread 126 is designed so that it extends around the internal face 110 of the body 102 at least once, and so that, relative to the central axis A of the screw cap 100, the beginning and end of the thread 126 are removed from one another by at least an additional 170 degrees. In other words, in use, to fully apply the screw cap 100 such that the entirety of the thread 126 of the screw cap 100 is in contact with the corresponding thread 128 of the container neck 12, the application angle must be equal to or greater than a predetermined amount. For example, the sum of one whole revolution and 170 degrees, i.e. 530 degrees.

This value of 530 degrees, at least, has been chosen to ensure that a comprehensive, hermetic seal is applied to the container neck 12 and so that the tamper-evident formation 124 operates correctly, as will be explained below. However, as will become apparent, the sealing formation 120 is configured such that application angles of less than 530 degrees will also provide adequate, hermetic sealing.

During sealing of a container using a closure system according to one or more embodiments described herein, the closure system is applied to the container neck by an assembly machine that rotates the closure system through an application angle of 630 degrees, for example, to account for any discrepancies in the positioning of either the machine, closure system or container neck.

Figure 6:
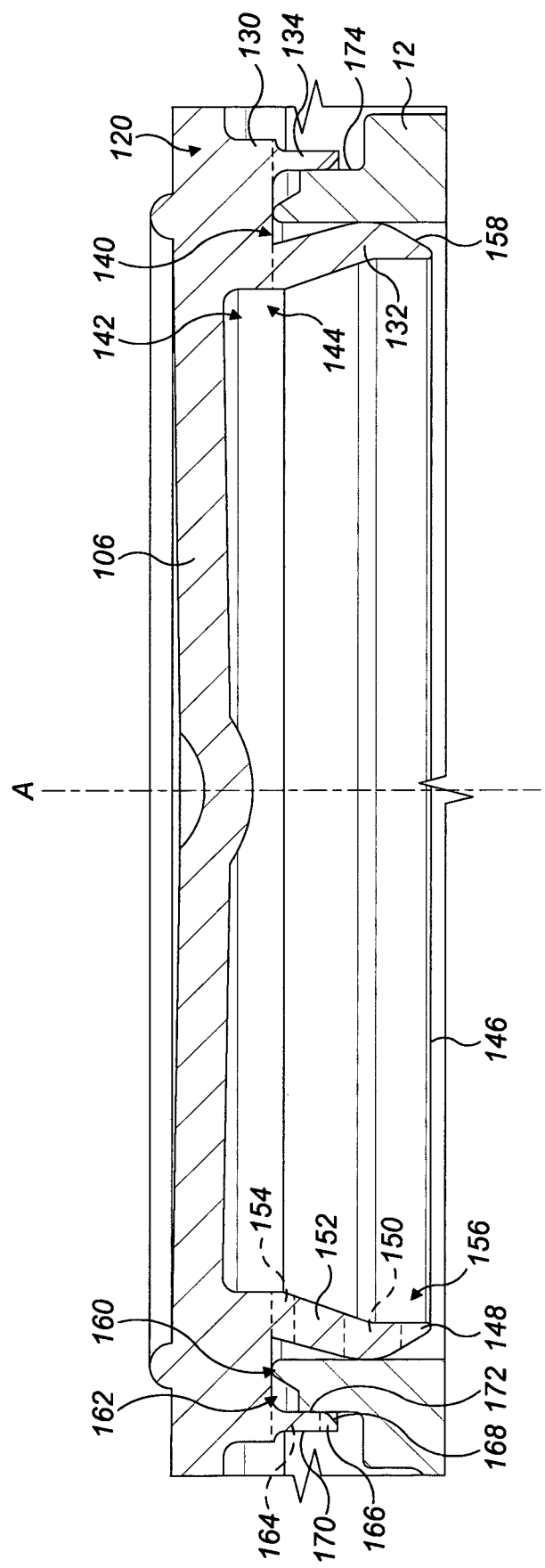
FIG. 6 is an enlarged view of a cross-section of a sealing formation of the closure system of FIG. 3, according to one or more embodiments shown and described herein.

A cross-section of the sealing formation 120 is shown in greater detail in FIG. 6. Here, as well as from FIGS. 4 and 5, it can be seen that the sealing formation 120 comprises a block or barrier 130, an inner seal 132 and an outer seal 134. While only shown in cross section here, it will be understood that the barrier 130, inner seal 132 and outer seal 134 are annular. The barrier 130 therefore forms a ring-like block having a substantially rectangular cross section. The depth of the closure system in the vicinity of the barrier 130 as shown by arrow 'b' is approximately twice the depth of the closure system at the vicinity of end disc 106 lying within the boundary of the barrier 130 and as shown by arrow 'a'. The barrier 130 extends downwardly from the end disc 106 into the internal volume of the body 102. To enable flexibility of the body 102, the barrier or block 130 is spaced from the wall 104 so as to define a channel 136 between an outer edge 138 of the barrier 130 and the internal surface 110 of the wall 104 (see FIG. 5).

The inner and outer seals 132, 134 extend from a lower surface 140 of the barrier 130, and extend downwardly, into the internal volume 108 of the body 104. The barrier 130 can therefore be considered to extend between, and to separate, the end disc 106 of the body 102 and the seals 132, 134.

As shown in FIGS. 5 and 6, the inner seal 132 is arranged to extend from the lower surface 140 of the barrier 130 such that an inwardly-facing surface 142 of the barrier 130 and an inwardly-facing surface 144 of the inner seal 132 are aligned. The barrier 130 and inner seal 132 therefore form a continuous inwardly-facing surface between the end disc 106 and a lower end of the inner seal 132.

In use, the inner seal 132 extends into the container neck 12 so as make contact with and to form a seal against the inner surface 50 of the container neck 12. The shape of the inner seal 132 is beneficially adapted to allow this to happen with relative ease, and, as shown in the cross section of FIG. 6, the inner seal 132 comprises four regions: a tip region 148, a pressure region 150, a central region 152, and a base region 154. In FIG. 6, the regions are distinguished by dashed lines at their boundaries.

The inner seal base region 154 is aligned with the inner surface 142 of the barrier 130, as described above, and extends vertically downwards. The central region 152 connects to the base region 154 and extends at an angle away from the central axis, A, of the screw cap 100. The central region 152 is configured to bias the pressure region 150 so that it maintains a hermetic seal against the container neck 12. The pressure region 150 also extends vertically downwards, away from the barrier 130, but in a different plane to that of the base region 154. Finally, the tip region 148 is connected to the pressure region 150 and is substantially aligned with the internal face 156 of the pressure region 150. The outward-facing surface 158 of the tip region 148 is inclined so that the cross section of the tip region 148 resembles a triangle. The cross sections of the base and pressure regions 154, 150 are substantially rectangular, while the cross section of the central region 152 is similar to a parallelogram.

So, when the screw cap 100 is being mounted to a container neck 12, the inner face 50 of the neck 12 initially comes into contact with the outward-facing, inclined surface 158 of the tip region 148. The incline of this surface 158 ensures there is limited resistance to the movement of the neck 12 upwards. The inner seal 132 is configured so as to have a similar diameter to the container neck 12, but so that movement of the container neck 12 against the tip region 148 will cause the inner seal 132 to deflect inwardly towards the central axis A. In other words, the inner seal 132 is dimensioned to have some interference with the container neck 12.

The shaping of the inner seal 132, and in particular the inclined face of the tip region 148 in combination with the angled central region 152 offsetting the pressure and tip regions 150, 148, allows a deflection of the inner seal 132 to take place without compromising the structural integrity of the inner seal 132. The material is also a key factor in this consideration, as will be considered later.

Prior to application, it will be noted from FIG. 4 that the surfaces of the pressure region 150 are not completely vertical, but slightly angled due to the biasing, or 'preload' or 'initial deflection', of the inner seal 132 to allow a flat seal to be formed between the internal surface 50 of the container neck 12 and the pressure region 150 once the screw cap 100 has been applied.

The inner seal 132 deflects until the container neck 12 is in contact with the pressure region 150, at which point the inner seal 132 has reached its point of maximum deflection. At this point, the pressure region 150 is applying a radially outward force to the internal surface 50 of the neck 12 due to the deflection. Through the rotation of the screw cap 100, the relative movement of the screw cap 100 and neck 12 means that, when the screw cap 100 is fully applied at approximately 530 degrees application angle, an upper face 160 of the neck 12 is in contact with the lower face 140 of the barrier 130 between the inner and outer seals 132, 134. In some situations, and in other embodiments, the neck 12 may not fully contact the lower face 140 of the barrier 130, but will be disposed very close to it.

In this way, the neck 12 may already be considered to be sealed by the action of one mechanism, if not two. The first sealing mechanism is the action of the pressure region 150 exerting a constant radially outward force on the inner surface 50 of the container neck 12. The flat outer face of the pressure region 150 allows a similar force to be exerted at all points, so that the contact between the neck 12 and the seal 132 is optimal. The second seal is formed by the contact of the neck's upper surface 160 with the lower face 140 of the barrier 130. Friction between the respective threads 126, 128 of the screw cap 100 and the neck 12 retains these surfaces 160, 140 of the neck 12 and barrier 140 in their relative positions, and in contact.

At least a third sealing mechanism is provided by the action of the outer seal 134. The outer seal 134, as can be seen from FIGS. 4 to 6, also extends downwardly away from the barrier 130, externally of the inner seal 132 and further from the central axis A. The inner and outer seal 132, 134 together form a channel 162 therebetween into which the container neck 12 is received, as already discussed. The outer seal 134 can be considered to comprise two regions that have a similar purpose to those of the inner seal 132: a pressure region 164 and a tip region 166. To distinguish between the pressure and tip regions 164, 166 of the inner and outer seals 132, 134, each pressure region and tip region 164, 166 will hereafter be preceded by 'inner' or 'outer' to denote which seal is being referred to.

In the embodiment of FIGS. 4 to 6, and as shown in most detail in FIG. 6, the outer pressure region 164 extends vertically downwardly. The outer pressure region 164 has a substantially rectangular cross section. The outer tip region 166 is substantially similar to the inner tip region 148, in that it incorporates an inclined face 168, but in contrast is positioned towards the common central axis A and the channel 162 between the inner and outer seals 132, 134 in which the container neck 12 will be received. The outer tip region 166 also comprises a non-inclined face 170 that is aligned with the outer pressure region 164.

So, when the screw cap 100 is applied, and the neck 12 is received against the inner seal 132, the outer seal 134 acts to guide the neck 12 into the channel 162 between the seals 132, 134 by the action of the inclined face 168 of its outer tip region 166. The inclined face 168 is also necessary to allow deflection of the outer seal 134 if the neck 12 is biased outwardly by the action of the inner seal 132 against its inner face 50. Once the neck 12 has been directed into the channel by the outer tip region 166, an internal surface 172 of the outer pressure region 164 forms a seal around the extremity of the open end of the container neck 12, and against the uppermost outer face 174 of the container neck 12.

The outer and inner seals 132, 134 are positioned such that the channel 162 formed between them is narrower than the thickness of the container neck 12 that they are to receive. The seals 132, 134 may therefore be deflected outwardly by the container neck 12 in order to ensure that the container neck 12 is correctly and hermetically sealed. This also ensures that if the neck 12 is thinner than the screw cap 100 has been designed for (due to manufacturing tolerance differences, for example), at least one of the inner and outer seals 132, 134 is likely to still make contact with the neck 12, and any movement of the neck 12 will result in the other seal 132, 134 making contact with the neck 12. Furthermore, if the diameter of the neck 12, i.e. the diameter between the internal faces 50 of the neck 12, is different to the diameter that the sealing formation 120 is optimised for, at least one seal 132, 134 will interfere with the container neck 12 at its respective tip region 148, 166, causing one hermetic seal to be formed at the very least.

Figure 7A:
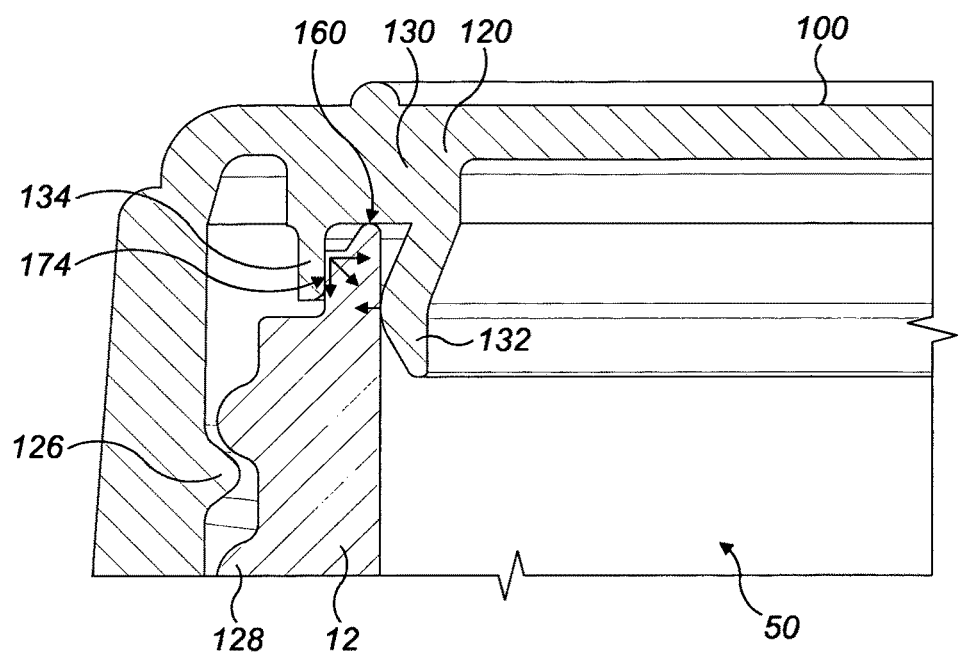
FIGS. 7a and 7b are simplified, partial cross-sections of a closure system according to an embodiment of the present disclosure in cooperation with the container neck, according to one or more embodiments shown and described herein.

In addition, the configuration of the sealing formation 120 enables a hermetic seal to be maintained at all points during the life-cycle of the screw cap 100 and container. As illustrated in FIG. 7a, which is a simplified diagram of the sealing formation 120 and shows only representations of the inner and outer seals 132, 134, the inner seal 132 exerts a radially outward, lateral force on the container neck 12 when applied, which biases the neck 12 against the inward-facing surface 172 of the outer seal 134. In turn, the outer seal 134 and barrier 130 together apply lateral and vertical forces on the upper and outer surfaces 160, 174 of the container neck 12, pressing it back towards and against the inner seal 132. By these mechanisms, three cooperative seals are formed with the container neck 12. Due to the radial nature of the seals, lateral movement of the container neck 12 relative to the screw cap 100 will firstly improve the sealing in the direction of the movement, before the force applied by the neck 12 on the screw cap 100 moves it in the same direction, re-establishing the triple seal formed by the barrier 130, the inner seal 132 and the outer seal 134.

It is also the case that the action of the inner and outer seal 132, 134 act to further seal the container at the threads 126, 128.

Figure 7B:
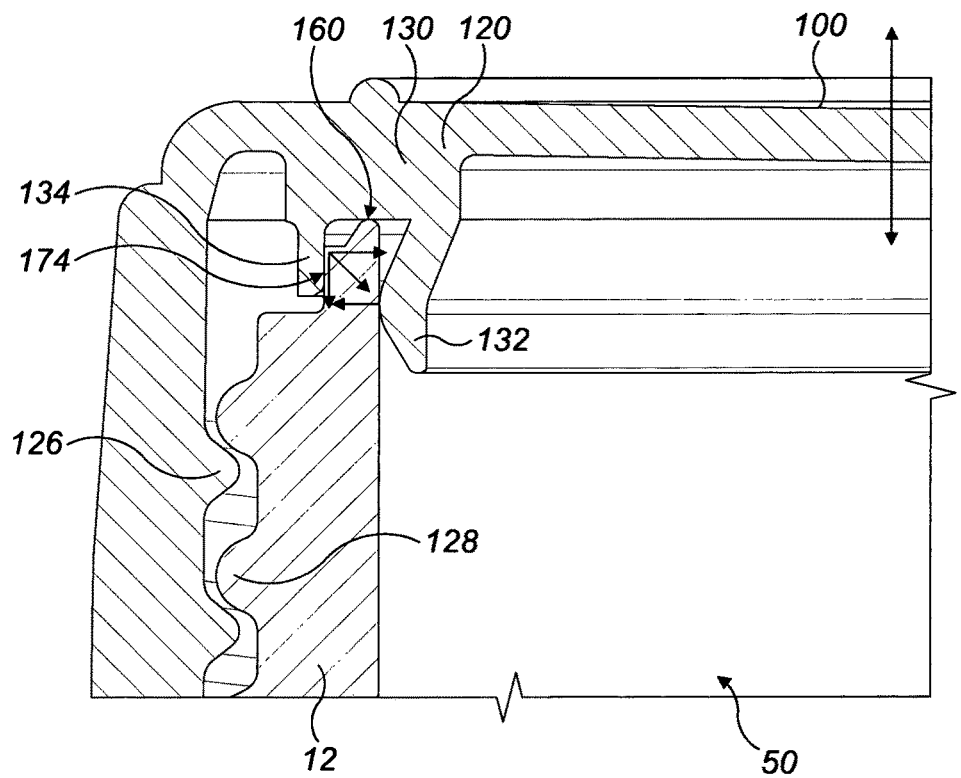

FIG. 7b illustrates the action of the seal in response to reduced pressure or increased pressure within the container.

In the case of reduced pressure within the container, the region of the end disc 106 bounded by the barrier 130 becomes concave. This movement of the end disc 106 increases the lateral, outward force applied by the inner seal 132 to the internal surface 50 of the container neck 12, further improving the sealing therebetween. The increased force here leads to an increase in sealing between the outer seal 134 and the container neck 12 too, as the container neck 12 is urged towards it.

Reduced pressure in the container may be experienced during a hot fill sterilisation process, in which the container is filled with their intended contents that have already been heated to a high temperature between approximately 80 and 100 degrees. The container is then rapidly cooled using water applied externally. Thus, the pressure within the container decreases following cooling.

Following cooling of the container and its contents following the sterilisation process, the pressure applied by each seal changes, with the sealing pressure applied by the inner seal reducing, and the sealing pressure applied by the outer seal increasing.

In the case of increased pressure within the container, the region of the end disc 106 bounded by the barrier 130 becomes convex, defining a convex region. This is likely to occur during water cascade sterilisation or in other sterilisation processes where the contents are sealed prior to heating in order to sterilise. The movement of the end disc 106 outwardly increases the lateral, inward force applied by the outer seal 134 on the outer surface 174 of the container neck 12, thus improving sealing between the container neck 12 and the outer seal 134. The increased pressure within the container increases the pressure on the exposed inwardly facing surface area 144 of the sealing formation 120. The exposed outwardly facing surface area 158 is much smaller, being only that of the inner tip region 148 and so the lateral force provided by the inner seal 132 is augmented by the pressure within the container.

The increased thickness of the end disc in the region of sealing formation 120 which results from the barrier 130 serves to compensate for the convex region of the end disc 106, with the barrier itself also providing a uniform area of contact and generating a hermetic seal with the container. The increased thickness at the sealing formation 120 as compared to the end disc 106 in the region bounded by the barrier 130 provides a better adaptation of the seal 132. Any displacement that is generated in the seal 132 permits the correct capping of the container lid with the container to be maintained due to flexibility provided in the thinner region of the end disc 106, with the region of greater thickness at the sealing formation 120 due to barrier 130 providing robust support to maintain efficient and effective inner and outer seals, 132 134.

It will be appreciated that the 'preload' or initial deflection of both seals 132, 134 as discussed above is enough to ensure that a seal is still formed with the container neck 12 even if there is no pressure change or if the container neck 12 is not biased towards either seal 132, 134 by the action of the other seal 132, 134.

Following the sterilisation of the solution within the container, the screw cap 100 maintains its seal with the container neck 12 in the same manner until the screw cap 100 is removed. The seal is maintained by the inner seal 132 until the screw cap 100 has been rotated through a majority of the application angle. This ensures that the seals cannot be broken without a substantial effort to remove the screw cap 100 first, or without the tamper-evident formation 124 indicating that the seal has been broken.

In practice, the screw cap 100 is applied to a container neck 12, and is rotated through a pre-determined angle to ensure that at least an adequate, hermetic seal is formed between the sealing formation 120 and the container neck 12. The screw cap 100 is typically machine applied so the application is correct and consistent with other applications.

Optimally, the screw cap 100 will be rotated so that at least an application angle of about 530 degrees is achieved. The sealing formation 120 is configured to form at least a first, main seal by the action of an inner seal 132 that is displaced by the rotational movement of the screw cap 100 relative to the container neck 12 by the action of respective threads 126, 128. The configuration and structure of the inner seal 132 are such that a region of the inner seal 132 acts to enter a sealing relation with an inner face 50 of the container neck 12 and to form a hermetic seal by this sealing relation. Movement of the portion of the body 102 to which the sealing formation 120 connects acts to improve the sealing performance of the main, inner seal 132, and pressure applied to the inner seal 132 from within the container also ensures a full seal is formed. A secondary, outer seal 134 is also provided that acts to maintain the container neck 12 within a narrow channel 162 and to form a second seal against an external face of the container neck 12. The interaction between the outer and inner seals 132, 134 ensures that at least one seal is maintained at all times, if not two, and that any movement of the neck 12 to counteract the action of one seal 132, 134 results in the enhancement of the effect of the other seal 132, 134. Another seal may be formed between the upper face 160 of the container neck 12 and a block, or barrier 130 that extends from the body 102.

Returning to FIGS. 4 and 5, the tamper-evident formation 124 will now be considered. The tamper-evident formation 124 comprises a tamper-evident band 176 (TEB), a flange 178, and a plurality of severable linkages or 'connectors' 180 that extend between the TEB 176 and a lowermost face 182 of the body 102, i.e. the face furthest removed from the end disc 106 and at the open end 107 of the body 102. In contrast to conventional designs, in which the tamper-evident band 106 is part of a component that is separate to the body 102, the tamper-evident formation 124 is integral with the body 102.

The purpose of the tamper-evident formation 124 is to indicate whether the screw cap 100 has been removed or interfered with prior to an end user removing it. To remove the screw cap 100, or at least, to break the seal created by the sealing formation 120 with the container neck 12, the connectors 180 between the tamper-evident band 176 and the body 102 must be broken to allow the progression of the female thread 126 relative to the male thread 128. Otherwise, the flange 178 comes into contact with a lower rim 58 of the container neck 12 and prevents any further rotation of the screw cap 100 in the direction require to rotate the screw cap 100 to remove it.

The tamper-evident formation 124, as discussed, is part of the single piece screw cap 100, or closure system, and attaches directly to the body 102 of the screw cap 100. This is achieved by the connectors 180 extending from the lower face 182 of the body 102 to the tamper-evident band 176, thereby coupling the body 102 and tamper-evident band 176. The connectors 180 are integral with both the tamper-evident band 176 and the body 102. As used herein, the lower face 182 of the body 102 is considered to be that surrounding the open end 107 of the body 102 and that opposite the upper, external surface 118 of the end disc 106. In use, the plane in which the lower face of the body 102 lies is perpendicular to the direction of application of the screw cap 100.

Figure 8:
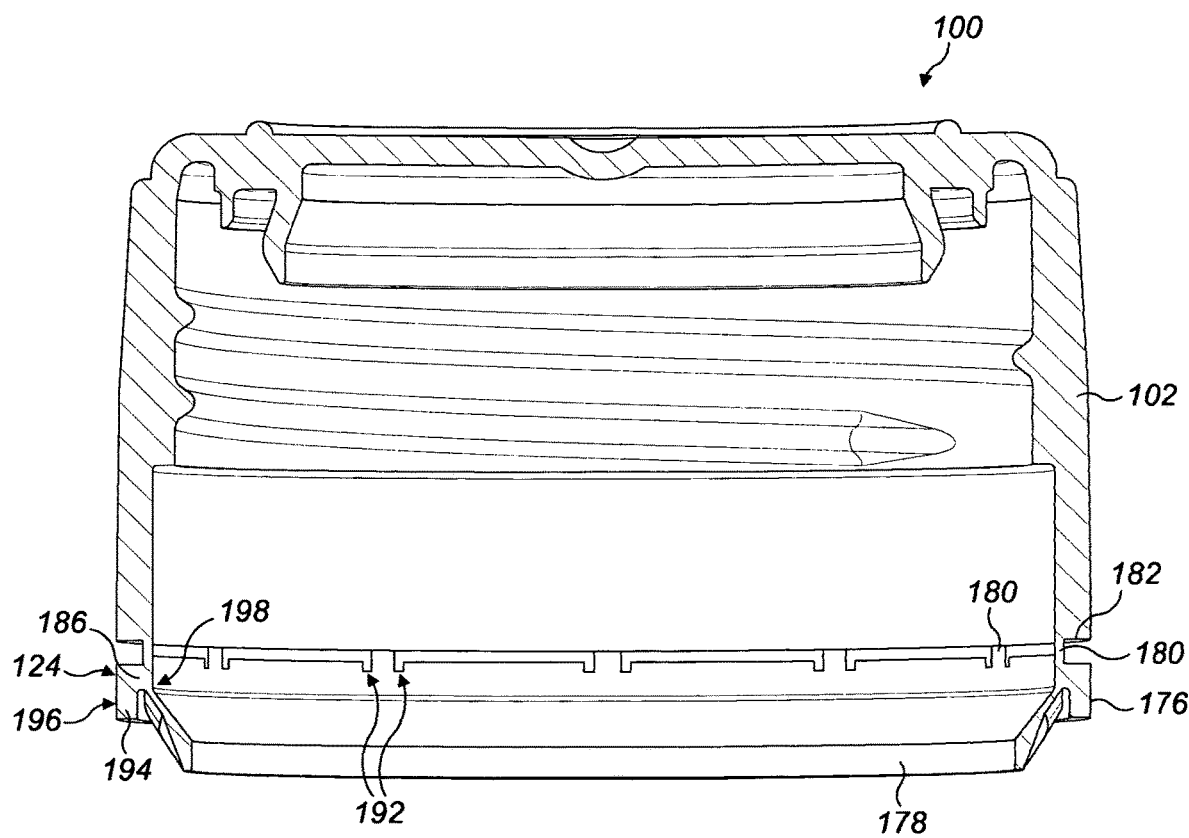
FIG. 8 is a cross section of the closure system of FIG. 3 in the first configuration, according to one or more embodiments shown and described herein.

FIG. 8 illustrates a cross-section of the closure system 100 in the first orientation, with the flange 178 pointing downwardly away from the rest of the closure system 100. In this diagram, the connectors 180 and their connection to the tamper-evident band 176 are shown clearly. The tamper-evident formation 124 is shown in isolation in FIG. 9 to show the configuration of the band 176 and connectors 180 in more detail. The connectors 180 and their connection to the tamper-evident band 176 are specifically designed to match the properties required due to the new, single-piece configuration as is described below with reference to both FIGS. 8 and 9.

As discussed above, each of the connectors 180 extends from the lower face 182 of the body 102 and connects to the tamper-evident band 176. Each connector 180 connects to the tamper-evident band 176 at an upper face 184 of a main ring 186 of the tamper-evident band 176. The tamper-evident band 176 incorporates a plurality of shallow grooves 188, each positioned between raised portions 190 and each having a similar depth. The shallow grooves 188 define the faces 184 to which the connectors 180 connect and attach, and are configured to lengthen the connectors 180 somewhat, whilst maintaining the optimum flange height relative to the container neck 12. As can be seen from FIG. 8, the grooves 188 are proportioned so that a cut-out 192 is incorporated to either side of the connectors 180. The cut-outs 192 separate the connectors 180 and raised portions 190, and provide additional flexing and bending of the connectors 180 before breaking or severance. This facilitates movement of the closure system 100 during use, without disconnecting the tamper-evident band 176 from the rest of the closure system 100. Thus, only when the seal is broken between the closure system 100 and the container neck 12 are the connectors 180 severed and the tamper-evident band 124 disconnected. Furthermore, the configuration of the cut-outs 192 and connectors 180 together also improves the flexibility of the tamper-evident formation 124 to avoid breakages of the connectors 180 during manufacturing and application of the system 100.

It is envisaged that the shallow grooves 188 will be between 0.2 mm and 0.5 mm deep, although shallower or deeper grooves may be incorporated depending upon the size of the closure system 100.

Figure 9:
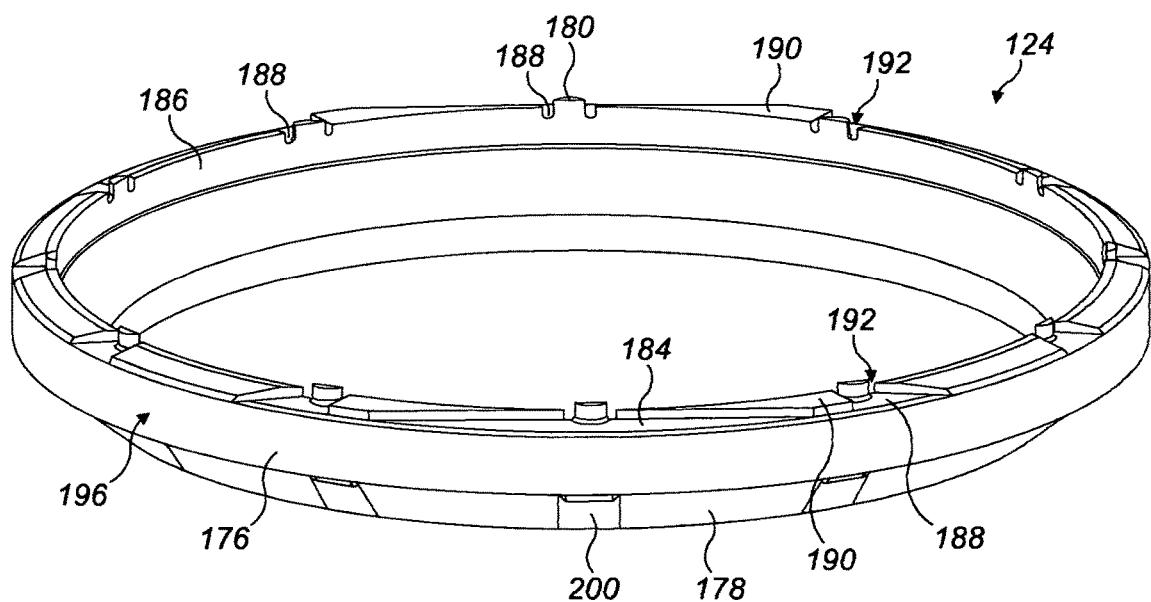
FIG. 9 is a perspective view of a tamper-evident formation, according to one or more embodiments shown and described herein.

Briefly considering the connection between the connectors 180 and the upper faces 184 of the tamper-evident band 176 formed by the shallow grooves 188, it can be seen from FIG. 9 that the connectors 180 are flared to provide a stronger point of connection, and to facilitate breakage of the connectors 180 at a point close to the mid-point of the connector 180.

The tamper-evident band (TEB) 176, which is shown in each of FIGS. 3 to 5, 8 and 9, will now be considered. As discussed, the TEB 176 is joined to the body 102 by a plurality of connectors 180. The TEB 176 comprises two portions: a main ring 186 and a skirt 194. The main ring 186 and skirt 194 are both annular portions, and together define the cross section of the TEB 176 as being similar to an L-shape. That is to say that each of the main ring 186 and skirt 194 have substantially rectangular cross sections, and are arranged relative to one another such that the external surface of the main ring 186 and skirt 194 are aligned.

This alignment results in the external surface 196 of the TEB 176 being continuous and the diameters of the main ring 186 and skirt 194 being equal. The skirt 194 is configured to be thinner than the main ring 186. However, the skirt 194 and main ring 186 are arranged to share an external surface 196, and so share an external diameter, which results in the thinner skirt 194 having an internal diameter that is greater than the internal diameter of the main ring 186. In the orientation shown in the figures, the main ring 186 is disposed above the skirt 194 so that the TEB 176 is shown to have a cross section similar to an inverted L-shape.

The TEB 176 is configured to allow passage of the container neck 12 through it so as to be received in the interior of the body 102 for hermetic sealing. To facilitate this, the main ring 186 has a substantially similar internal diameter to the body 102. In the embodiment shown in FIGS. 3 to 9, the internal diameter of the main ring 186 of the TEB 176 is equal to that of the body 102 of the closure system 100 at its open end 107. The external diameter of the TEB 176 is also equal to that of the body 102 at its open end 107. It will be appreciated that the external and internal diameters of the main ring 186 and/or skirt 194 may also be larger than the internal and external diameters of the open end 107 of the body 102.

The purpose of the skirt 194 is firstly to ensure that the distance between the TEB 176 and a body portion (not shown) of the container 12 is minimised, effectively 'trapping' the TEB 176 between the rim 58 of the container neck 12 and the body of the container, to aid with breaking the connectors 180 during removal of the closure system 100, and secondly to restrict over-application of the closure system 100, so that the TEB 176 and flange 178 lie just beneath the rim 58 of the container neck 12. Minimising the distance between the TEB 176 and the body portion of the container ensures that it is particularly difficult to tamper with the flange 178 or the container neck 12 without breaking the connectors 180 and disconnecting the TEB 176.

Additionally, the skirt 194 is thinner than the main ring 186 so as to allow the closure system 100 to be correctly applied without interaction between the TEB 176 and the container body causing the connectors 180 to break. In other words, if the closure system 100 is applied to the container neck 12 such that the end of the female thread 38 of the system reaches the end of the male thread 40 of the container neck 12, there may be contact between the TEB 176 and the container body. The skirt 194 guides the TEB 176 around the body, allowing for an outward displacement of the TEB 176 relative to the body, and ensuring that the 'trapping' action is maintained. The skirt 194 is dimensioned to ensure that the outward displacement of the TEB 176 due to interaction with the container body is insufficient to break the connectors 180.

The flange 178 comprises a thin annular ring that is flexibly connected to and extends inwardly from an internal surface 198 of the main ring 186. The flange 178 is movable relative to the TEB 176 by virtue of its flexible connection, and is retained in the positions to which is moved to by the properties of the material used. The formation of the flange 178 also biases it into one of two possible orientations. The flange 178 incorporates a plurality of thinner regions or partial slits 200 that enhance this biasing and the movement of the flange 178.

In a first orientation or configuration, shown in FIGS. 3, 8 and 9, the flange 178 extends from the main ring 186 inwardly and downwardly. In a second orientation or configuration, shown in FIGS. 4 and 5, the flange 178 extends inwardly and upwardly from the main ring 186. The flange 178 is movable between these two orientations prior to application. The flange 178 is manufactured in the first orientation to allow removal of the closure system 100 from the apparatus used to manufacture the closure system 100, for example from a mould. Once the closure system 100 has been removed from the apparatus, the flange 178 is moved to its second orientation prior to application of the closure system 100 to the container neck 12. The closure system 100 is then applied to the container neck 12 with the flange 178 positioned in its second orientation. When disposed in the first orientation, the flange 178 is oriented to 'point' downwardly, away from the closure system 100, while in the second orientation, the flange 178 is angled upwardly, 'pointing' into the internal volume 108 of the closure system 100, and, following application, towards the neck 12 of the container, and in particular towards the lower rim 58 formed in the container neck 12.

Therefore, in the second orientation, the flange 178 allows application of the closure system 100 to a container neck 12 but restricts its removal. To facilitate application, the flange 178 folds upwardly so as to be pressed against the main ring 186 of the TEB 176 and the body 102 of the closure system 100 to allow it to pass over the rim 58 formed in the container neck 12. However, to ensure that the closure system 100 is unable to be removed without disconnecting the TEB 176, an interference is incorporated and the connectors 180 and TEB 176 are manufactured to flex during application to allow passage of the flange 178 past the rim 58, but to not break because of the force exerted upon them.

Once the closure system 100 has been fully applied to the container neck 12, the flange 178 moves from being held against the body 102 and TEB 176 to an angled position, pointing towards the rim 58 of the container neck 12, as shown in FIG. 5. The diameter of the flange 178 is designed to result in as small a gap as possible between the container neck 12 and the flange 178, and between the rim 58 and the flange 178, so that the flange 178 cannot be 'unfolded' from its second orientation to its first orientation in use.

In the second orientation, the flange 178 is oriented so as to point inwardly and upwardly towards the rim 58. Therefore, when the closure system 100 is rotated relative to the neck 12, the rim 58 restricts movement of the flange 178. The force applied to remove the closure system 100 therefore breaks the connectors 180. The flange 178 is configured so that it does not move from the second orientation to the first orientation during removal of the closure system 100.

It should also be noted that the flange 178 is also dimensioned to ensure that in its second orientation it does not interfere generally with the rim 58 as this may cause the outer seal to adopt a non-optimum position.

A number of the features discussed above are functional because of properties associated with the material from which they are manufactured. The material used to manufacture such a closure system must be chosen carefully to allow it to be used in a number of situations.

The closure system 100 described herein may be suitably manufactured from a thermoplastic. In particular, the closure system may be manufactured from a polypropylene copolymer, and more specifically, an ethylene-propylene copolymer.

The polypropylene copolymer may include, for example, either polypropylene 5571 manufactured by Total Petrochemicals USA, Inc. or polypropylene 2108 manufactured by Pinnacle Polymers using UNIPOL PP technology. These particular polypropylene copolymers are particularly tough, have high melt strengths and stability, and are suitable for use with consumable items, as will now be described.

The material used in the closure system 100 may fulfil a number of criteria. For example, the material may be able to withstand temperatures of up to and above 120° C. without deforming or melting at least. In some processes, the temperatures may as high as 130° C. or higher. Under these conditions, the material must retain its shape and rigidity to ensure that the seal is sufficient and maintained, and that the general shape of the closure system is not lost. The material may of course be subject to some deformation as a result of internal pressure changes during heating or cooling, notably some concavity/convexity generated in the region of the end disc 106 that lies within the barrier 130, but any such deformation may not be permanent. The material must also be stable so as not to contaminate the solution and so that it retains its colour throughout its lifetime.

Furthermore, in some embodiments, the material may have a high flexural modulus, tensile strength at yield and % elongation at yield to allow for correct design of the connectors of the tamper-evident formation. These properties therefore ensure that the connectors are not broken without a pre-determined required torque being applied to the closure system by an end user.

The material may be resistant to any impacts so as to maintain the hermetic seal between the materials, and must allow the deflection of the seals and movement of the flange between the two configurations.

Finally, for ease of manufacture, the material may be both lightweight and capable of being injection moulded or 3D printed to allow a quick manufacturing process at minimal expense.

Each of polypropylene 5571, which is a high impact copolymer polypropylene having a melt flow of 7 g/10 min, and polypropylene 2108, which is a high impact copolymer polypropylene having a melt flow of 8 g/10 min, fulfils each of the above criteria. These polymers have particularly beneficial properties compared to a standard polypropylene and high density polyethylene. A comparison experiment was performed to compare the properties of the chosen polypropylenes with a high-density polyethylene according to the standard ASTM-D638.

According to this standard, a plurality of trials are performed on small samples of the material to determine the tensile properties of the material. The trials comprise clamping the sample between two clamps of an extensometer and moving the clamps away from each other until the sample breaks. From these trials, the parameters tensile strength at yield in MPa, flexural modulus in MPa and % elongation at yield are determined. The results of the experiment for each of the three tested materials, polypropylene 2108, polypropylene 5571, and high-density polyethylene, are shown in respective Tables 1 to 3 below. The mean values for each parameter are shown are underlined at the foot of each table.

TABLE 1

Results of tests according to ASTM D-638 for polypropylene 2108

| Tensile Strength at yield (MPa) | Flexural Modulus (MPa) | % Elongation at yield |
|---|---|---|
| 21.05 | 1000.5 | 386.3 |
| 22.24 | 1086.5 | 281.9 |
| 22.38 | 1009.7 | 384.7 |
| 22.02 | 1101.9 | 270.3 |
| 21.84 | 880.8 | 343.1 |
| 21.68 | 1043.6 | 372.5 |
| 22.51 | 1014.9 | 344.9 |
| 22.24 | 1086.5 | 281.9 |
| 22.57 | 922.0 | 280.7 |
| 21.97 | 875.4 | 312.2 |
| 22.24 | 1086.4 | 281.9 |
| 22.02 | 1014.9 | 270.3 |
| 22.06 | 1010.3 | 317.6 |

TABLE 2

Results of tests according to ASTM D-638 for polypropylene 5571

| Tensile Strength at yield (MPa) | Flexural Modulus (MPa) | % Elongation at yield |
|---|---|---|
| 20.39 | 806.5 | 303.0 |
| 20.66 | 836.9 | 403.1 |
| 20.42 | 851.4 | 271.3 |
| 21.18 | 797.4 | 378.3 |
| 20.81 | 756.4 | 325.9 |
| 20.91 | 828.7 | 397.4 |
| 22.07 | 809.1 | 301.9 |
| 21.62 | 899.4 | 280.7 |
| 21.52 | 891.3 | 399.7 |
| 21.16 | 806.4 | 310.9 |
| 21.41 | 875.1 | 265.5 |
| 21.86 | 866.2 | 385.7 |
| 21.17 | 835.4 | 335.3 |

TABLE 3

Results of tests according to ASTM D-638 for high-density polyethylene

| Tensile Strength at yield (MPa) | Flexural Modulus (MPa) | % Elongation at yield |
|---|---|---|
| 20.0 | 718.0 | 344.1 |
| 19.4 | 720.9 | 305.5 |
| 19.5 | 743.3 | 264.8 |
| 19.6 | 649.2 | 272.9 |
| 19.4 | 687.9 | 268.5 |
| 19.3 | 712.1 | 341.8 |
| 20.3 | 775.9 | 264.6 |
| 20.4 | 646.6 | 297.4 |
| 19.9 | 713.4 | 194.0 |
| 19.9 | 641.6 | 280.9 |
| 20.4 | 748.1 | 307.2 |
| 20.3 | 691.9 | 282.6 |
| 19.9 | 704.0 | 285.4 |

As can be seen, the mean tensile strength, flexural modulus and % elongation at yield of polypropylene 2108 and polypropylene 5571 are superior to those of the high-density polyethylene. These properties mean that polypropylene 2108 and polypropylene 5571 are particularly suitable materials from which to manufacture the closure system.

It will be appreciated that other thermoplastics having all of the above-mentioned properties may be used to manufacture the closure system.

Many modifications may be made to the above examples without departing from the scope of the present disclosure as defined in the accompanying claims.

The invention claimed is:

1. A closure system for a screw top container intended to contain a pharmaceutical or surgical medium, the closure system comprising:
    a screw cap including a main body comprised of an annular wall with an internal thread for cooperating with an external thread adjacent an open end of the container, the body having a first open end for receiving the open end of the container and a second end closed by an end disc;
    a tamper-evident band connected to the screw cap at the open end of the main body by at least one severable linkage; and
    a sealing formation within the main body for forming a plurality of seals with the open end of the container, the sealing formation comprising:

annular inner and outer seals, the inner seal configured to apply outward pressure to an internal surface of the open end of the container so as to form a first hermetic seal, the outer seal configured to apply inward pressure to an external surface of the open end of the container so as to form a second hermetic seal, wherein a cross-section of the outer seal comprises a flat perpendicular edge with respect to a horizontal axis when disengaged from the container, and a block between the inner and outer seals, the block defining a flat surface extending between and connecting the annular inner and outer seals such that the annular inner and outer seals extend from the flat surface, the flat surface providing a uniform area of contact to form in use a third hermetic seal with an upper surface of the open end of the container, wherein:

the screw cap, sealing formation and tamper-evident band are integrally formed as a single unit for maintaining a hermetic seal;

a total thickness of the screw cap in the region of the block is at least two times greater than a thickness of the end disc in regions of the end disc adjacent to the block on both a radially internal and radially external side of the block, thereby forming a hollow channel between the outer seal and the annular wall such that the outer seal does not contact an internal surface of the annular wall when the screw cap is fully secured to the container, whereby the block provides rigidity to the end disc so that first, second, and third hermetic seals are formed between the container and the inner seal, the outer seal, and the block when the container fitted with the screw cap is subjected to a water cascade sterilization process; and the tamper evident band comprises a main ring and a circumferential flange flexibly connected to and extending inward from an internal surface of the main ring at a flange base to a flange tip, and a plurality of partial slits are formed within the circumferential flange at the flange base and spaced from the flange tip.

2. The closure system of claim 1, wherein the inner seal comprises a base region connected to the block and a pressure region configured to form the first seal with the container that is offset from the base region relative to a common central axis of the closure system.

3. The closure system of claim 2, wherein the inner seal is configured to be displaced inwardly towards a common central axis of the closure system when coming into contact with the open end of the container.

4. The closure system of claim 3, wherein the pressure region comprises a convex region whereby the sealing pressure exerted by the pressure region against the inner surface of the open end of the container increases during the water cascade sterilization process.

5. The closure system of claim 1, wherein the outer seal is configured to be displaced outwardly away from a common central axis of the closure system when coming into contact with the open end of the container.

6. The closure system of claim 5, wherein the base region of the inner seal has a length such that a seal is formed against the inner surface of the container at a position beyond the position of the seal formed against the outer surface of the container by the outer seal.

7. The closure system of claim 1, wherein the outer seal is configured to exert a sealing pressure around the extremity of the open end of the container neck, which pressure increases following the water cascade sterilization process as the medium in the container cools.

8. The closure system of claim 1, wherein at least one of the inner and outer seals comprises a tip region configured to guide the open end of the container into a channel formed therebetween.

9. The closure system of claim 1, wherein the flange is movable between first and second orientations prior to application of the system, and wherein, in the second orientation, the flange is configured to interact with the container to restrict removal of the closure system.

10. The closure system of claim 9, wherein first removal of the closure system requires severance of the at least one linkage when the flange is in the second orientation.

11. The closure system of claim 10, wherein, in the first orientation, the flange extends away from the first open end of the screw cap, and wherein, in the second orientation, the flange extends towards and/or through the first open end screw cap.

12. The closure system of claim 1 manufactured from a single mold using an injection molding process.

13. The closure system of claim 1 comprising a polypropylene copolymer.

14. The closure system of claim 13, wherein the polypropylene copolymer has a high tensile strength at yield, a high flexural modulus and a high percentage elongation at yield.

15. The closure system of claim 13, wherein the polypropylene copolymer is an ethylene-propylene copolymer.

16. The closure system of claim 1, wherein the inner seal comprises an inner-facing surface comprising a base region extending substantially perpendicular to the horizontal axis from the end disc, an intermediate region proceeding at an oblique angle relative to the horizontal axis from the base region, and a distal region extending substantially perpendicular to the horizontal axis from the intermediate region.

17. A sealed container comprising a container having an open end and the closure system of claim 1.

18. A closure system for a screw top container intended to contain a pharmaceutical or surgical medium, the closure system comprising:

a screw cap including a main body comprised of an annular wall with an internal thread for cooperating with an external thread adjacent an open end of the container, the body having a first open end for receiving the open end of the container and a second end closed by an end disc;

a tamper-evident band connected to the screw cap; and a sealing formation for forming a plurality of seals with the open end of the container, the sealing formation comprising:

annular inner and outer seals, the inner seal configured to apply outward pressure to an internal surface of the open end of the container so as to form a first hermetic seal, the outer seal configured to apply inward pressure to an external surface of the open end of the container so as to form a second hermetic seal, wherein a cross-section of the outer seal comprises a flat perpendicular edge with respect to a horizontal axis when disengaged from the container, and a block between the inner and outer seals, the block defining a flat surface extending between and connecting the annular inner and outer seals such that the annular inner and outer seals extend from the flat surface, the flat surface providing a uniform area of contact to form in use a third hermetic seal with an upper surface of the open end of the container, wherein:

the screw cap and sealing formation are integrally formed as a single unit;

a total thickness of the screw cap in the region of the block is at least two times greater than a thickness of the end disc in regions of the end disc adjacent to the block on both a radially internal and radially external side of the block, thereby forming a hollow channel between the outer seal and the annular wall such that the outer seal does not contact an internal surface of the annular wall when the screw cap is fully secured to the container, whereby the block provides rigidity to the end disc so that first, second, and third hermetic seals are formed between the container and the inner seal, the outer seal, and the block when the container fitted with the screw cap is subjected to a water cascade sterilization process; and the tamper-evident band comprises a main ring and a circumferential flange flexibly connected to and extending inward from an internal surface of the main ring at a flange base to a flange tip, and a plurality of partial slits are formed within the circumferential flange at the flange base and spaced from the flange tip.

* * * * *